United States Patent
Werker et al.

(10) Patent No.: US 10,128,667 B2
(45) Date of Patent: Nov. 13, 2018

(54) DC/DC CONVERTER WITH CAPACITOR VOLTAGE BALANCING

(71) Applicant: Hanon Systems, Daejeon (KR)

(72) Inventors: Stephan Werker, Merzenich-Golzheim (DE); Mario Lenz, Kerpen (DE); Stephen Newton, Ann Arbor, MI (US)

(73) Assignee: HANON SYSTEMS, Daejeon (KR)

( * ) Notice: Subject to any disclaimer, the term of this patent is extended or adjusted under 35 U.S.C. 154(b) by 118 days.

(21) Appl. No.: 15/223,064

(22) Filed: Jul. 29, 2016

(65) Prior Publication Data

US 2017/0033569 A1 Feb. 2, 2017

(30) Foreign Application Priority Data

Jul. 30, 2015 (DE) .......... 10 2015 112 524

(51) Int. Cl.
*H02J 7/00* (2006.01)
*H02J 7/34* (2006.01)
(52) U.S. Cl.
CPC .......... *H02J 7/0014* (2013.01); *H02J 7/0016* (2013.01); *H02J 7/0068* (2013.01); *H02J 7/345* (2013.01)
(58) Field of Classification Search
CPC ...... H02J 7/0014; H02J 7/0016; H02J 7/0018; H02J 7/0019; B60L 11/1866; H01M 2010/4271
USPC ......................................... 320/118
See application file for complete search history.

(56) References Cited

U.S. PATENT DOCUMENTS

| | | | | |
|---|---|---|---|---|
| 3,815,009 A | * | 6/1974 | Berger ................... | H02M 3/337 307/66 |
| 4,295,216 A | * | 10/1981 | Truesdell ............... | G11B 3/445 310/318 |
| 4,564,767 A | * | 1/1986 | Charych ................ | H02J 9/062 307/48 |
| 4,670,667 A | * | 6/1987 | Petit ...................... | H03K 17/10 323/311 |
| 6,005,304 A | * | 12/1999 | Seelig .................... | H02J 5/005 307/104 |
| 6,031,738 A | * | 2/2000 | Lipo ...................... | H02M 7/487 363/37 |

(Continued)

FOREIGN PATENT DOCUMENTS

EP 2760115 A1 7/2014
JP 2004129455 A 4/2004
(Continued)

*Primary Examiner* — M Baye Diao
(74) *Attorney, Agent, or Firm* — Shumaker, Loop & Kendrick, LLP; James D. Miller (57) ABSTRACT

A method for voltage balancing of series connected capacitors, wherein a voltage in an intermediate circuit of an electric circuit can be easily and safely balanced between a plurality of series connected capacitors and thus these components are operated safely in terms of their voltage strength. This problem is solved in that the voltage balancing is accomplished in that, in a first step of the method, an at least partial discharging of a first or a second capacitor occurs across a first or second winding of a transformer, while thanks to the action of the transformer a current is induced in a second step of the method in the second or first winding which charges the second or first capacitor as a charging current.

9 Claims, 5 Drawing Sheets

(56) References Cited

U.S. PATENT DOCUMENTS

| | | | | |
|---|---|---|---|---|
| 6,150,795 A * | 11/2000 | Kutkut | ............... | H02J 7/0018 320/118 |
| 6,188,586 B1 * | 2/2001 | Farrington | ............ | H02M 3/337 363/17 |
| 6,731,524 B2 * | 5/2004 | Elek | ............... | H02M 1/34 323/207 |
| 7,531,987 B2 * | 5/2009 | Ohasi | ............... | H02J 7/0019 307/10.7 |
| 8,067,902 B2 * | 11/2011 | Newman, Jr. | ...... | H05B 41/2822 315/209 R |
| 8,288,991 B2 * | 10/2012 | Sardat | ............... | B60L 3/06 320/118 |
| 8,536,824 B2 * | 9/2013 | St-Jacques | ............ | H02J 7/0016 320/103 |
| 8,675,378 B2 * | 3/2014 | Beland | ............... | H02M 1/088 363/71 |
| 8,692,515 B2 * | 4/2014 | Nakao | ............... | H02J 7/0016 320/116 |
| 8,866,394 B2 * | 10/2014 | Wu | ............... | H05B 33/0815 315/188 |
| 9,085,243 B2 * | 7/2015 | Chatroux | ............... | B60L 3/0046 |
| 9,130,391 B2 * | 9/2015 | Garnier | ............... | B60L 11/1853 |
| 9,312,705 B2 * | 4/2016 | Permuy | ............... | H02J 7/0014 |
| 9,413,221 B1 * | 8/2016 | Kim | ............... | H02M 1/32 |
| 2006/0119319 A1 * | 6/2006 | Sakurai | ............... | H02J 7/0016 320/116 |
| 2011/0210701 A1 * | 9/2011 | Nakamura | ............ | H01M 10/441 320/118 |
| 2012/0139492 A1 * | 6/2012 | Kleffel | ............... | H01G 9/155 320/118 |
| 2014/0084868 A1 * | 3/2014 | Yun | ............... | H02J 7/0063 320/118 |
| 2014/0306662 A1 * | 10/2014 | Kim | ............... | H02J 7/0016 320/118 |
| 2015/0236534 A1 * | 8/2015 | Kim | ............... | H02J 7/0016 320/118 |

FOREIGN PATENT DOCUMENTS

| | | |
|---|---|---|
| JP | 2004201361 A | 7/2004 |
| KR | 10-2012-0096375 A | 9/2010 |

* cited by examiner

Fig. 1

Prior art

Fig. 2

Prior art

Fig. 3

Prior art

DC/DC CONVERTER WITH CAPACITOR VOLTAGE BALANCING

CROSS-REFERENCE TO RELATED PATENT APPLICATION

This patent application claims priority to German Patent Application No. DE 102015112524.2 filed on Jul. 30, 2015, the disclosure of which is incorporated herein by reference in its entirety.

FIELD OF THE INVENTION

The invention concerns a method for voltage balancing of series connected capacitors, wherein at least two series connected capacitors are provided and wherein a high voltage is applied across this series circuit. The invention pertains in particular to a voltage balancing, by which is meant an equalizing of different sized voltages of two components such as capacitors, between at least two capacitors which are used in a high voltage system and hooked up in series.

BACKGROUND OF THE INVENTION

So-called dc to ac converters, also known as inverters, are used to drive electric motors with high voltage and thus high internally stored intermediate circuit energy, especially in vehicles with onboard network voltages over 60 V. From this voltage range onward, one speaks in the automotive industry of so-called high voltage (HV) applications. One such application is, for example, an inverter for an electrically operated refrigerant compressor in a vehicle.

High voltage circuits, especially in electric or hybrid vehicles, also use so-called intermediate circuit capacitors in order to temporarily store electric energy in the high voltage circuit of the inverter.

These intermediate circuit capacitors are often designed to make use of electrolytic capacitors. Such electrolytic capacitors have the advantage of a high energy density, a large operating temperature range, and low costs.

The electrolytes used in electrolytic capacitors are at present available for maximum voltages up to 450 V. Hence, this type of capacitor can be used as a single capacitor in electric circuits on account of the safety margin of up to around 400 V which needs to be observed.

If higher voltages than 400 V are to be stored in an intermediate circuit, such as a voltage of 600 V, several capacitors are often arranged in series (a series circuit) for this.

For identical ideal components such as capacitors, the voltage in the series circuit would be evenly divided among the series connected capacitors. In the example of a series circuit with two capacitors $C_1$ and $C_2$ ideally the intermediate circuit voltage applied of 600 V would be divided so that 300 V apiece is applied across the capacitors $C_1$ and $C_2$.

But in practice this is seldom the case, owing to parasitic properties of a real capacitor. Thus, unless suitable countermeasures are taken, there is a danger that one of the capacitors $C_1$ or $C_2$ will be loaded more heavily than the other and thus may be ruined by an excess voltage.

The reason for this uneven voltage division between the capacitors $C_1$ and $C_2$ lies in a so-called leakage current $I_{leak}$.

For a uniform division of the voltage drops across the series connected capacitors, so-called "balancing or symmetrization", symmetry resistors are used in the prior art. These symmetry resistors are each arranged in parallel with the associated capacitors and are dimensioned such that the current I through these resistors is large in relation to the leakage current $I_{leak}$ of the capacitors. Thus, the voltage drop across the symmetry resistor as well as that across the parallel switched capacitor will be determined by the larger current I and can thus be set at an equal value.

Another possibility of voltage balancing, or a uniform division of the voltage drops across all components placed in the series circuit, is to use transistors in a so-called emitter follower circuit. Usually, for two capacitors one also uses two transistors in order to equalize the voltages.

The drawback to this solution is that in this case as well a balancing current flow through the semiconductor which is larger than the leakage current $I_{leak}$ of the electrolytic capacitors used.

The drawback to these known solutions from the prior art is the constant current flow through the symmetry resistors or semiconductors. This occurs even when the voltage drop at the series connected capacitors is equal and no balancing is necessary. As a result, energy is consumed by the unused current flow and thus heat is generated and needs to be dissipated.

As a result, uneconomically, the components for the balancing need to be designed according to the heat losses, which makes them large in size and more costly.

The problem which the invention proposes to solve is to indicate a method for the voltage balancing of series connected capacitors with which a voltage in an intermediate circuit of an electric circuit can be easily and safely balanced among several series connected capacitors and thus these components are operated safely in terms of their voltage strength.

SUMMARY OF THE INVENTION

The problem is solved by a method with the features per patent claim 1 of the independent patent claims. Modifications are indicated in the dependent patent claims.

The present invention makes it possible to balance the voltage in the intermediate circuit of an electric circuit, of a power electronics, of an inverter, especially a power electronics which drives an electric motor of a refrigerant compressor used in the motor vehicle, and thereby makes it possible to safely operate several components hooked up in series, especially electrolytic capacitors, in terms of the voltage strength.

An essential component in the implementing of the method is a transformer with a first and a second winding, wherein the first and the second winding have the same number of turns N.

The two windings are coupled together by a magnetic flux. It is provided that each time one end of a winding is connected to a first terminal of a component, such as a capacitor. The other end of the winding is connected across a parallel circuit, consisting of a switch and a diode, to a second terminal of the component.

In this way, by activating a switch in a first circuit, a current flow can be produced, such as a discharging of a capacitor across the corresponding winding. In this way, a magnetic field is generated in a first winding, which due to the magnetic flux induces a current in a second winding. This current flows in the second circuit in directional manner, owing to the effect of the diode, and brings about a charging of the capacitance arranged in the second circuit. This occurs until the voltage across the capacitor being charged corresponds to the voltage of the discharging capacitor. As of the moment when both voltages across the capacitors are the same size, the diode becomes blocking and prevents a further charge reversal.

In this way, a balancing of the voltage across the electrolytic capacitors occurs.

It is provided that the at least partial discharging is started by a closing of a first or second switch, such as a semiconductor switch. By means of such a semiconductor switch, a closing and opening of the circuit switch can be done very easily and quickly, controlled by a control signal which is provided. The control signals can have different voltage variations, such as one or more pulses.

Intermediate circuits preferably make use of electrolytic capacitors. It is advantageous to recommence the process of the discharging of the one capacitor and the charging of the second capacitor several times in succession with the same or different intervals of time. For this, it is also provided to limit the discharging process in time. Thus, for example, several short discharging processes can be carried out in succession, bringing about several short charging processes. This, on the one hand, prevents an unwanted complete discharging of the one capacitor, while on the other hand a charging of the other capacitor can occur in stages.

It is also provided that the charging and discharging processes of the capacitors occur only until an equality of the voltages across the capacitors is achieved. Thus, it is possible to reduce the losses occurring in the course of the processes as well as a production of heat.

The method is designed so that always only one switch is closed at a given time, while the other switch remains open. It is provided that the course of the process is controlled by the use of a central control unit, which not only ensures an asynchronous switching of the switches, but also controls a time sequence, such as the time of turning on a switch and also its switch duration.

Since always only one switch is closed in the so-called discharging circuit, a diode is arranged in the charging circuit in parallel with the opened switch. This diode enables a current flow for the balancing of the voltage across the electrolytic capacitors in the circuit not closed during the asynchronous switching processes.

Since the choice of a semiconductor switch to be triggered depends on the voltages $U_{C1}$ and $U_{C2}$ applied across the capacitors, it is advantageous to determine the voltages. This can be done by means of suitable (voltage) sensors and a corresponding circuit arrangement. According to the method, a triggering of the first or second semiconductor switch then occurs such that the capacitor for which the higher voltage has been determined will be discharged and the other one will be charged.

With this determination of the voltages across the capacitors it can also be assured that when the voltages are equal the process of the voltage balancing is not started.

It is especially advantageous to link the process of the voltage balancing with a generating of an output voltage at the transformer. For this, the transformer is outfitted with a secondary winding. A current generated in this secondary winding is rectified across a diode and smoothed out by means of a capacitor in order to provide an output voltage.

It is also advantageous for the first and the second capacitor in the series circuit to be formed by means of a plurality of parallel switched partial capacitances. For example, in order to increase the capacitance of the capacitors, it is customary to hook up several capacitors, also known as partial capacitances, in a parallel circuit in the form of a capacitor bank. This produces two capacitor banks to be balanced according to the method.

BRIEF DESCRIPTION OF THE DRAWINGS

Further details, features and benefit of embodiments of the invention will emerge from the following description of sample embodiments with reference to the corresponding drawings. There are shown.

DESCRIPTION OF SPECIFIC EMBODIMENTS

Figure 1:
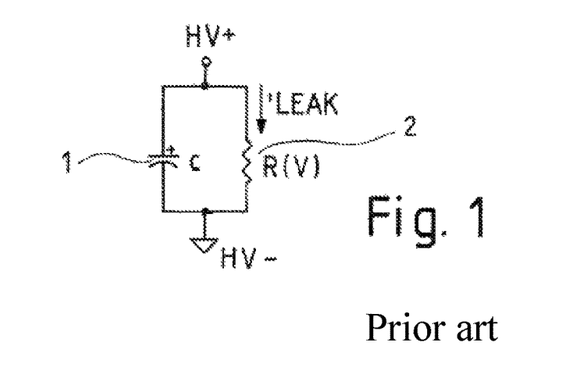
FIG. 1: an equivalent circuit of a capacitor with parasitic leakage current.

FIG. 1 shows an equivalent circuit for a capacitor 1 with a flowing leakage current $I_{leak}$. The leakage current, owing to parasitic properties of the capacitor 1, flows in the equivalent circuit across a resistor 2, also called a leakage resistance. Thanks to this leakage current, which differs in size from one capacitor to another, different sized voltage drops are produced across the capacitors in a series circuit of several capacitors.

Figure 2:
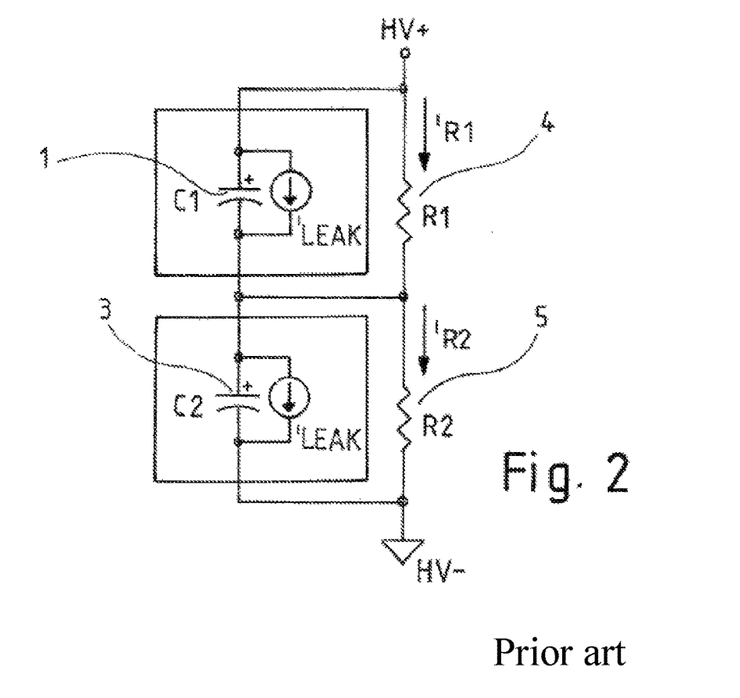
FIG. 2: a balancing of capacitors with the aid of symmetry resistors from the prior art.

FIG. 2 shows a known technique of the prior art for preventing different sized voltage drops across the capacitors. It is provided that a resistor 4, 5 is arranged at each capacitor 1, 3. The current $I_{R1}$, $I_{R2}$ flowing through these resistors 4, 5 is established to be much larger than the leakage current of the capacitors 1, 3. In this way, it can be assured that the voltage drops across the capacitors 1, 3 are of the same size.

As already mentioned, this entails power losses and an unwanted production of heat.

Figure 3:
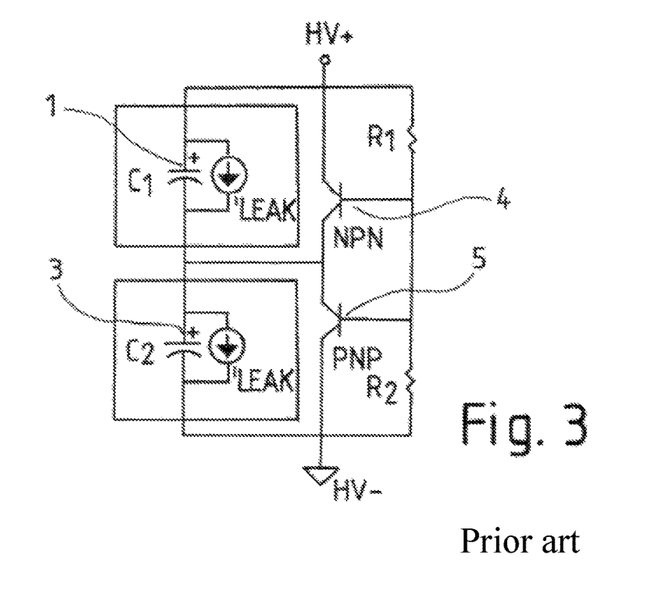
FIG. 3: a balancing with the help of an emitter follower circuit per the prior art.

FIG. 3 shows another known solution of the prior art in which the resistors of FIG. 2 are simulated by two transistors, represented as NPN and PNP transistors, in FIG. 3. The collector-emitter section of the NPN transistor forms resistor 4, while the emitter-collector section of the PNP transistor simulates resistor 5.

Here as well, the different sized leakage currents of the capacitors 1, 3 are compensated by the much larger currents through the transistors. Since a current still flows in this solution, the drawbacks once again occur in the energy consumption and a production of unwanted heat. When using such compensation circuits in the field of power electronics, the transistors 6, 7 also have to have correspondingly large dimensions, which leads to unwanted costs.

What is especially disadvantageous about the above-described solution is that even in the event that the leakage currents are of the same size, and thus the voltage drops across the capacitors 1, 3 are also of the same size, a current will flow in the parallel branch and losses will occur.

Figure 4:
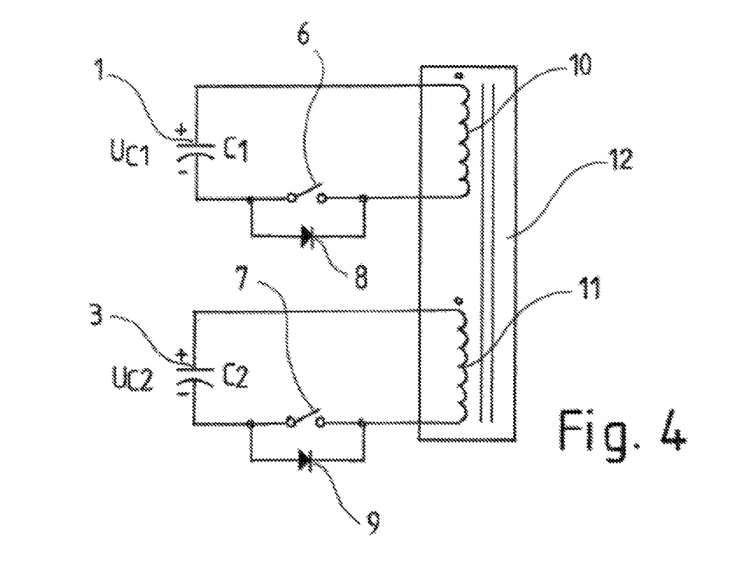
FIG. 4: a simplified representation of the balancing circuit according to the invention.

FIG. 4 shows a simplified representation of the balancing circuit according to the invention. In this representation, the series circuit of the capacitors is not completely shown, for example, in the intermediate circuit of an inverter. This figure is only meant for some of the following explanations.

Here is shown a first capacitor 1, across which there is a first voltage drop $U_{C1}$. With this capacitor 1 in a first circuit, there is arranged a first winding 10 of a transformer 12 as well as a parallel circuit of a first semiconductor switch 6 and a first diode 8.

In a second circuit, there is arranged a second capacitor 3 across which there is a second voltage drop $U_{C2}$. The second circuit furthermore comprises a second winding 11 as well as a parallel circuit, consisting of a second semiconductor switch 7 and a second diode 9.

The present method makes it possible, by means of a corresponding asynchronous triggering of the semiconductor switches 6, 7 and the use of the magnetic flux in the transformer 12 between the first winding 10 and the second winding 11 to charge one of the capacitors 1, 3 with the smaller voltage until such time as an equalizing of the voltages of the capacitors 1, 3 is achieved, and thus the voltage $U_{C1}$ is equal to $U_{C2}$.

Figure 5:
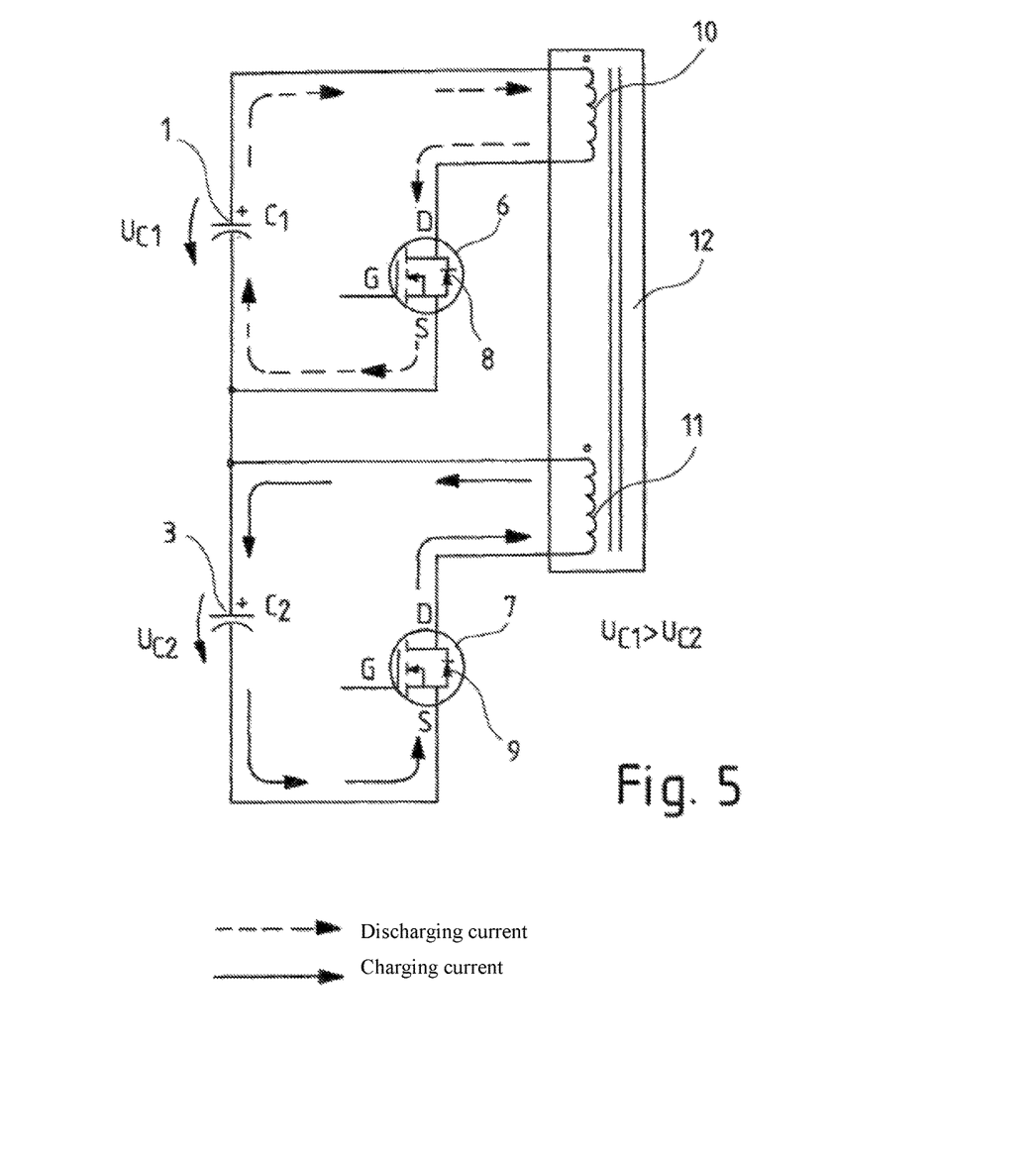
FIG. 5: a balancing process according to the invention by switching the first semiconductor switch.

FIG. 5 shows, by means of a balancing circuit corresponding to the notion of the patent, the balancing process according to the invention with two series connected capacitors 1, 3. The capacitors 1, 3 are designed as poled electrolytic capacitors.

In a first example, it is assumed that the voltage $U_{C1}$ at the first capacitor 1 is initially larger than the voltage $U_{C2}$ at the second capacitor 3.

The balancing circuit, consisting for example of a first field effect transistor 6 and a second field effect transistor 7 and the transformer 12 with two windings 10, 11 of equal number N. By switching on the first transistor 6, this becomes conductive in its drain-source section. This activation, or control, is accomplished by a voltage on the electrode controlling the semiconductor switch 6, also called a gate. In the example shown, the controlling electrode is the gate terminal of the semiconductor switch 6. The same also holds for the semiconductor switch 7.

Due to the charging of the first capacitor 1, there occurs a current flow which is variable in time through the first winding 10 of the transformer 12, which generates a magnetic flux in the transformer 12. The discharging current of the capacitor 1 flowing in the first circuit, represented in FIG. 5 by means of an arrow with a dash-dash line, corresponds to a magnetization current for the transformer 12.

The magnetic flux in the transformer 12 produces an induction of a current in the second winding 11. This current represents a charging current, shown by means of an arrow with a solid line, which flows, in the event that the second semiconductor switch 7 is not activated and thus is open, from the winding 11 through the second diode 9 and charges the second capacitor 3. Thanks to this charging, a balancing of the voltages $U_{C1}$ and $U_{C2}$ across the capacitors 1, 3 is made possible.

Now, if the same voltage drop occurs thanks to the balancing across the capacitors 1, 3 ($U_{C1}$ is equal to $U_{C2}$), no equalizing current will occur during a switching process of the semiconductor switch 6 in the conductor loops, since the number of turns N and the magnetic flux $\Phi$ in both turns is the same (Faraday's law of magnetic flux).

$$V_1 = N_1(d\Phi_1/dt) \text{ and } V_2 = N_2(d\Phi_2/dt)$$

In practice, the parasitic antiparallel diodes present in the field effect transistors 6, 7 through the semiconductor structure, the so-called body diodes, could take on the function of the first and second diodes 8, 9. In this way, the use of additional diodes can advantageously be avoided.

It is provided that a central control unit, not shown, provides corresponding trigger signals for the semiconductor switch 6, 7. This control unit provides the trigger signals such that always only one of the semiconductor switches 6, 7 is controlled or patched through at a given time. Furthermore, the control unit establishes the form of the trigger signals, such as a meandering form or a square form, and the times for the pulse length and pulse interval. The connections between the controlling electrodes of the semiconductor switches 6, 7 and the central control unit are not shown explicitly in FIGS. 5 to 7.

Figure 6:
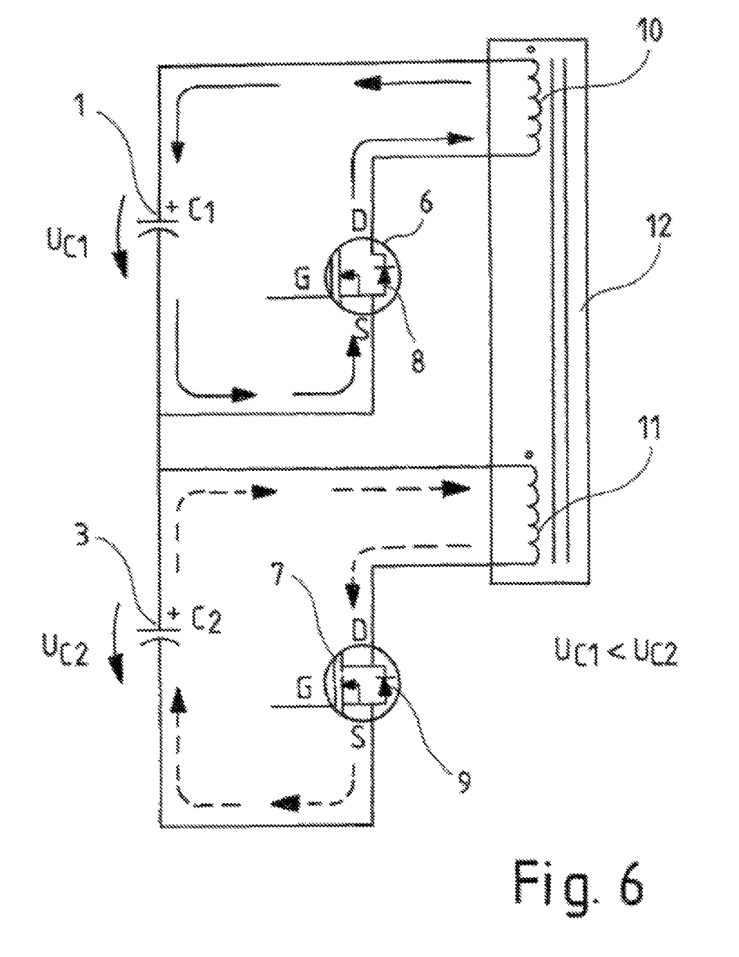
FIG. 6: a balancing process according to the invention by switching the second semiconductor switch.

In a second example, it is assumed that the voltage $U_{C1}$ at the capacitor 1 is smaller than the voltage $U_{C2}$ at the capacitor 3.

In this case, a charging of the first capacitor 1 is accomplished by a corresponding switching process of the semiconductor switch 7. This equalizing process is as shown in FIG. 6.

By switching on the second transistor 7, this becomes conductive in its drain-source section. Due to the charging of the second capacitor 3, a current flow varying in time is produced through the second winding 11 of the transformer 12. This current flow generates a magnetic flux in the transformer 12. The discharging current of the capacitor 3 flowing in the second circuit corresponds to a magnetizing current for the transformer 12.

The magnetic flux in the transformer 12 causes the induction of a current in the first winding 10. This current likewise constitutes a charging current and in the event that the first semiconductor switch 6 is not activated and thus not closed it flows from the winding 10 across the first parasitic diode 8 of the field effect transistor 6 and charges the first capacitor 1. Thanks to this charging, a balancing of the voltages $U_{C1}$ and $U_{C2}$ across the capacitors is achieved.

It is provided that the central control unit switches the semiconductor switches 6, 7 in cycles, for example, that is with a certain timing frequency. Alternatively, a switching of the semiconductor switches 6, 7 as needed can also be done. For this, it is proposed to measure the voltages $U_{C1}$ and $U_{C2}$ at the capacitors 1, 3 by means of a logic and corresponding sensors. In this way, it is determined which of the capacitors 1, 3 has the higher voltage. Depending on this determination, one of the semiconductor switches 6, 7 which is required for the balancing of the voltages is activated, as described above. Such a measure further reduces the losses occurring in the circuit, since when the voltages at the capacitors 1, 3 are equal no switching processes are performed.

Repeated cyclical switching processes provide another benefit, in that the asynchronous switching of the semiconductor switches 6, 7 produces an equal current and thus heat load for the semiconductor switches 6, 7.

If, as called for in the prior art, both semiconductor switches 6, 7 are switched at the same time (synchronously), unavoidably the first one of the semiconductor switches 6, 7 which is switched on will always be loaded with the higher on current and the last one of the semiconductor switches 6, 7 switched off with a higher off current. The drawback takes on special relevance when the upper first semiconductor switch 6 has to be activated across an insulated driver circuit with a delay time resulting from this.

In these instances, the semiconductor switches 6, 7 must be designed for higher power in the case of a synchronous switching.

Each switching process of the semiconductor switches 6, 7 produces, besides the balancing current in the transformer 12, a magnetizing current, which magnetizes the transformer 12. In this way, it is possible to store energy with the transformer 12 and transfer it to the secondary side of the transformer 12.

Furthermore, it is advantageous to enlarge the proposed circuit arrangement with an additional switching process on the secondary side of the transformer 12 to produce a reverse converter and thus obtain a voltage on the secondary side of the transformer 12.

Reverse converters are especially often used in power electronics as isolated, galvanically separated d.c. voltage converters for the voltage supply of electronic components such as ICs, sensors, and semiconductors.

Figure 7:
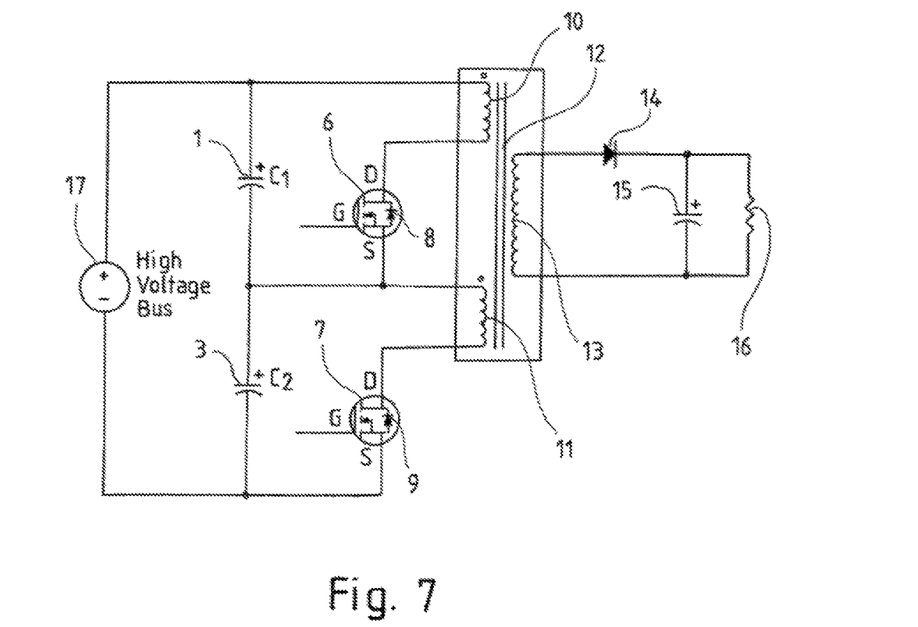
FIG. 7: an alternative embodiment of the balancing circuit according to the invention with a reverse converter.

FIG. 7 shows an expansion of the circuit according to the invention, by which synergies from balancing and reverse converter circuit can be utilized. It is especially advantageous here that each reverse converter switching process results in a balancing of the series connected intermediate circuit capacitors 1, 3.

FIG. 7 shows a reverse converter with integrated balancing circuit. The intermediate circuit capacitors 1, 3 are connected to the power supply voltage 17 (high voltage bus). In parallel with each of the capacitors 1, 3 are arranged the drain-source sections of the semiconductor switches 6, 7 designed as MOS-FETs as well as a corresponding primary windings 10, 11.

On the secondary side of the transformer 12 are the rectifier diode 14 as well as the storage capacitor 15. The resistor 16 constitutes a load for the reverse converter. Each switching of the semiconductor switches 6, 7 controlled by the central control unit results in a possible equalizing current for the balancing of the capacitors 1, 3 and also at the same time a transformation of energy from the primary side, formed by the windings 10, 11, to the secondary side of the transformer 12, which is formed by the secondary winding 13.

Several of the benefits which can be achieved with the invention are listed below:
  Increased efficiency as compared to the prior art, due to lower power losses for the balancing. Especially when the balancing process is started by a logic only when needed.
  Lower and uniform loading of the semiconductors thanks to the asynchronous switching cycle.
  Utilization of synergies between reverse converter and balancing circuit. This reduces the componentry costs, the space needed on the circuit board, and the costs.

LIST OF REFERENCE SYMBOLS 1 first capacitor, intermediate circuit capacitors
2 leakage resistance
3 second capacitor, intermediate circuit capacitors
4 first resistor
5 second resistor
6 first semiconductor switch, transistor, field effect transistor
7 second semiconductor switch, transistor, field effect transistor
8 first diode
9 second diode
10 first winding, turns, primary winding
11 second winding, turns, primary winding
12 transformer
13 secondary winding
14 rectifier diode
15 storage capacitor
16 load resistance
17 power supply voltage (high voltage)

What is claimed is:

1. A method for a voltage balancing of series connected capacitors, the method comprising the steps of:
  providing at least two series connected capacitors of a series circuit, each of the capacitors connected to a power supply voltage; and
  applying a high voltage across the series circuit, wherein the voltage balancing is accomplished by the steps:
    at least partial discharging a first one of the capacitors or a second one of the capacitors across a first winding or a second winding of a transformer, wherein each of the first winding and the second winding is a primary winding of the transformer disposed on a primary side of the transformer; and
    inducing a current by action of the transformer in the second winding or the first winding to charge the second one of the capacitors or the first one of the capacitors as a charging current;
  providing a rectifier diode, a storage capacitor, and a resistor electrically connected with a secondary winding disposed at a secondary side of the transformer; and
  transforming energy from the primary side of the transformer to the secondary side of the transformer with switching of the first one of the capacitors or the second one of the capacitors.

2. The method according to claim 1, wherein at least a partial discharging is started by closing a first semiconductor switch or a second semiconductor switch.

3. The method according to claim 1, wherein the charging current is directed by the rectifier diode.

4. The method according to claim 1, wherein the at least partial discharging step and the inducing a current step are repeated.

5. The method according to claim 4, wherein the repeating of the steps is done until a voltage drop across each of the capacitors is equal in size.

6. The method according to claim 2, wherein the first semiconductor switch and the second semiconductor switch are triggered by a central control unit which generates control signals for the first semiconductor switch and the second semiconductor switch so only one of the first semiconductor switch and the second semiconductor switch is activated.

7. The method according to claim 6, further comprising the steps of:
  determining a voltage value for each of a first voltage $U_{C1}$ and a second voltage $U_{C2}$ across the capacitors before generating the control signals for the first semiconductor switch and the second semiconductor switch; and
  triggering and switching through one of the first semiconductor switch and the second semiconductor switch depending on a magnitude of the first voltage $U_{C1}$ and the second voltage $U_{C2}$.

8. The method according to claim 1, wherein a directional output current is created by the secondary winding of the transformer and the rectifier diode.

9. The method according to claim 1, wherein the first one of the capacitors and the second one of the capacitors are formed by a plurality of parallel switched partial capacitances.

* * * * *